(12) United States Patent
Kowada

(10) Patent No.: US 8,327,627 B2
(45) Date of Patent: Dec. 11, 2012

(54) EXHAUST EMISSION CONTROL DEVICE

(75) Inventor: Minoru Kowada, Tokyo (JP)

(73) Assignee: Hino Motors, Ltd., Hino-shi (JP)

( * ) Notice: Subject to any disclaimer, the term of this patent is extended or adjusted under 35 U.S.C. 154(b) by 294 days.

(21) Appl. No.: 12/679,677

(22) PCT Filed: Oct. 23, 2008

(86) PCT No.: PCT/JP2008/002999
§ 371 (c)(1),
(2), (4) Date: Mar. 24, 2010

(87) PCT Pub. No.: WO2009/054132
PCT Pub. Date: Apr. 30, 2009

(65) Prior Publication Data
US 2010/0205945 A1 Aug. 19, 2010

(30) Foreign Application Priority Data

Oct. 26, 2007 (JP) ................................ 2007-278734

(51) Int. Cl.
*F01N 3/035* (2006.01)
(52) U.S. Cl. ................ 60/295; 60/297; 60/301
(58) Field of Classification Search ............ 60/295, 60/296, 297, 301
See application file for complete search history.

(56) References Cited

U.S. PATENT DOCUMENTS

| 2009/0313979 A1 | 12/2009 | Kowada |
| 2010/0000203 A1 | 1/2010 | Kowada |
| 2010/0018188 A1 | 1/2010 | Torisaka et al. |

FOREIGN PATENT DOCUMENTS

| DE | 20 2006 011 281 U1 | 11/2006 |
| DE | 20 2006 012 530 U1 * | 12/2006 |
| DE | 20 2007 010 435 U1 | 11/2007 |
| JP | 6 63818 | 9/1994 |
| JP | 2004 108221 | 4/2004 |

(Continued)

OTHER PUBLICATIONS

Supplementary European Search Report issued Jan. 25, 2011, in European Patent Application No. 08 84 1303.

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

Provided is an exhaust emission control device in which only a casing for a particulate filter can be easily taken out of position with a casing for a selective reduction catalyst being left on a vehicle body in a reliably supported state.
The exhaust emission control device has a particulate filter 5 and a selective reduction catalyst 6 housed in casings 7 and 8, respectively, and arranged side by side with entry ends of them are directed in one and the same direction, and an S-shaped communication passage 9 which interconnects the casings 7 and 8 and is intermediately provided with urea water addition means 10. The communication passage 9 is intermediately provided with a separable portion for suitable separate-off, and the casing 8 for the selective reduction catalyst 6 is supported by a frame 15 on a vehicle body independently of the casing 7 for the particulate filter 5. The casing 7 for the particulate filter 5 is detachably mounted and supported on the vehicle body and on the casing 8 for the selective reduction catalyst 6.

2 Claims, 5 Drawing Sheets

FOREIGN PATENT DOCUMENTS

| | | |
|---|---|---|
| JP | 2005 155404 | 6/2005 |
| JP | 2007 40224 | 2/2007 |
| JP | 2008 196328 | 8/2008 |
| WO | 2006 003713 | 1/2006 |
| WO | WO 2006087541 A1 * | 8/2006 |

OTHER PUBLICATIONS

U.S. Appl. No. 12/524,727, filed Jul. 28, 2009, Kowada.
U.S. Appl. No. 12/529,024, filed Aug. 28, 2009, Endo, et al.
U.S. Appl. No. 12/667,767, filed Jan. 5, 2010, Yabe et al.
U.S. Appl. No. 12/674,106, filed Feb. 18, 2010, Kimura.
U.S. Appl. No. 12/676,056, filed Mar. 2, 2010, Kowada.
U.S. Appl. No. 12/677,957, filed Mar. 12, 2010, Kowada, et al.
U.S. Appl. No. 12/678,941, filed Mar. 18, 2010, Endo, et al.
U.S. Appl. No. 12/738,994, filed Apr. 21, 2010, Kowada.
U.S. Appl. No. 12/742,321, filed May 11, 2010, Kowada, et al.

* cited by examiner

EXHAUST EMISSION CONTROL DEVICE

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the particulate filter and the selective reduction catalyst, thereby attaining lessening of both the particulates and $NO_x$.

Such addition of the urea water to the selective reduction catalyst is conducted between the particulate filter and the selective reduction catalyst, so that in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact exhaust emission control device as shown in FIG. 1 has been proposed by the applicant as JP 2008-196328A. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. A discharge end of the particulate filter 5 is connected to an entry end of the selective reduction catalyst 6 through an S-shaped communication passage 9 with a urea water addition means 10 at its upstream side such that the exhaust gas 3 discharged through the discharge end of the particulate filter 5 is reversely curved back into the entry end of the adjacent selective reduction catalyst 6.

Arranged in the casing 7 and in front of the particulate filter 5 is an oxidation catalyst 11 for oxidization treatment of unburned fuel in the exhaust gas 3, and arranged in the casing 8 and behind the selective reduction catalyst 6 is an ammonia reducing catalyst 12 for oxidization treatment of surplus ammonia.

With such construction being employed, particulates in the exhaust gas 3 are captured by the particulate filter 5. The urea water is added into the exhaust gas 3 upstream of the communication passage 9 by the urea water addition means 10 and is pyrolyzed into ammonia and carbon dioxide gas, so that $NO_x$ in the exhaust gas 3 is favorably reduced and depurated by the ammonia on the selective reduction catalyst 6. As a result, both the particulates and $NO_x$ in the exhaust gas 3 are lessened.

In this case, the exhaust gas 3 discharged through the discharge end of the particulate filter 5 is reversely curved back by the communication passage 9 into the entry end of the adjacent selective reduction catalyst 6. As a result, enough reaction time is ensured for production of ammonia from the urea water since a long distance between the selective reduction catalyst 6 and the urea water added position by the urea water addition means 10 is ensured and the flow of the exhaust gas 3 becomes turbulent due to the reversed curving to facilitate mixing of the urea water with the exhaust gas 3.

Moreover, the particulate filter 5 and selective reduction catalyst 6 are arranged in parallel with each other and the communication passage 9 is arranged between and along the filter 5 and catalyst 6, so that the whole structure becomes compact in size to substantially improve its mountability on a vehicle.

However, with such structure having the heavy particulate filter 5 and heavy selective reduction catalyst 6 arranged side by side and interconnected by the S-shaped communication passage 9, relative twisting tends to be caused between the filter 5 and the catalyst 6, so that stress may be concentrated to connections and curved portions of the communication passage 9. In order to overcome this, as shown in FIG. 2, the casings 7 and 8 for the particulate filter 5 and selective reduction catalyst 6 are interconnected at plural axial positions through connections 13 and 14 on upper and lower sides so as not to be relatively twisted. Then, the casings 7 and 8 are arranged between a pair of brackets 16 and 17 fixed to a frame 15 on a vehicle body and are supported through connections 18 and 19 by the brackets 16 and 17, respectively.

As a prior art literature pertinent to the invention, there exists, for example, the following Patent Literature 1.

[Patent Literature 1] JP 2005-155404A

SUMMARY OF INVENTION

Technical Problems

Since ash derived from the lubricant oil and produced through combustion in the cylinders gradually accumulates in the particulate filter 5, the casing 7 has to be taken out of position so as to make the particulate filter 5 directly cleaned by, for example, air or water cleaning or so as to substitute a new particulate filter 5. However, it is difficult to take out only the casing 7 for the particulate filter 5 since both the casings 7 and 8 are interconnected through the S-shaped communication passage 9. Moreover, in the above-mentioned support shown in FIG. 2, taking-out of only the casing 7 for the particulate filter 5 would cause the casing 8 for the selective reduction catalyst 6 to be supported in a cantilever manner, failing in keeping the casing 8 in a favorably supported state. Thus, the whole of the exhaust emission control device including the casings 7 and 8 has to be taken out all at once, which disadvantageously results in considerable labor required for maintenance of the particulate filter 5.

The invention was made in view of the above and has its object to provide an exhaust emission control device which makes it possible to easily take a casing for a particulate filter out of position with a casing for a selective reduction catalyst being left on a vehicle body in a reliably supported state.

Solution to Problems

The invention is directed to an exhaust emission control device wherein a particulate filter and a selective reduction catalyst arranged downstream of said particulate filter and capable of selectively reacting $NO_x$ with ammonia even in the presence of oxygen are housed in casings, respectively, and arranged side by side such that entry ends of the particulate filter and the selective reduction catalyst are oriented to one and the same direction, an S-shaped communication passage being provided for introduction of the exhaust gas discharged from a discharge end of the particulate filter to the entry end of the adjacent selective reduction catalyst through reversed turnabout, urea water being addible intermediately of said communication passage, characterized by comprising a separable portion for suitable separate-off arranged intermediately of the communication passage, the casing for the selective reduction catalyst being supported on a vehicle body independently of the casing for the particulate filter, the casing for the particulate filter being detachably mounted and supported on the vehicle body and on the casing for the selective reduction catalyst.

Thus, in this manner, separation through the separable portion intermediately of the communication passage and disconnection of the casing for the particulate filter from the vehicle body and from the casing for the selective reduction catalyst make it possible to take the casing for the selective reduction catalyst out of position on the vehicle body with the casing for the particulate filter being left on the vehicle body in a reliably supported state, which is less troublesome than the conventional taking-out of the whole of the exhaust emission control device all at once, leading to lessening in workload.

In order to conduct the invention more specifically, it is preferable that the casing for the selective reduction catalyst is arranged between and attached to both of a pair of brackets fixed to a frame on a vehicle body, the casing for the particulate filter being arranged downward of the casing for the selective reduction catalyst and being detachably mounted on one of the brackets and on the casing for the selective reduction catalyst.

ADVANTAGEOUS EFFECTS OF INVENTION

The above-mentioned exhaust emission control device of the invention, in which only the casing for the particulate filter can be easily taken out of position with the casing for the selective reduction catalyst being left on the vehicle body in a reliably supported state, can exert an excellent effect that labor for maintenance of the particulate filter can be substantially lessened in comparison with the conventional taking-out of the whole of the exhaust emission control device all at once.

Figure 1:
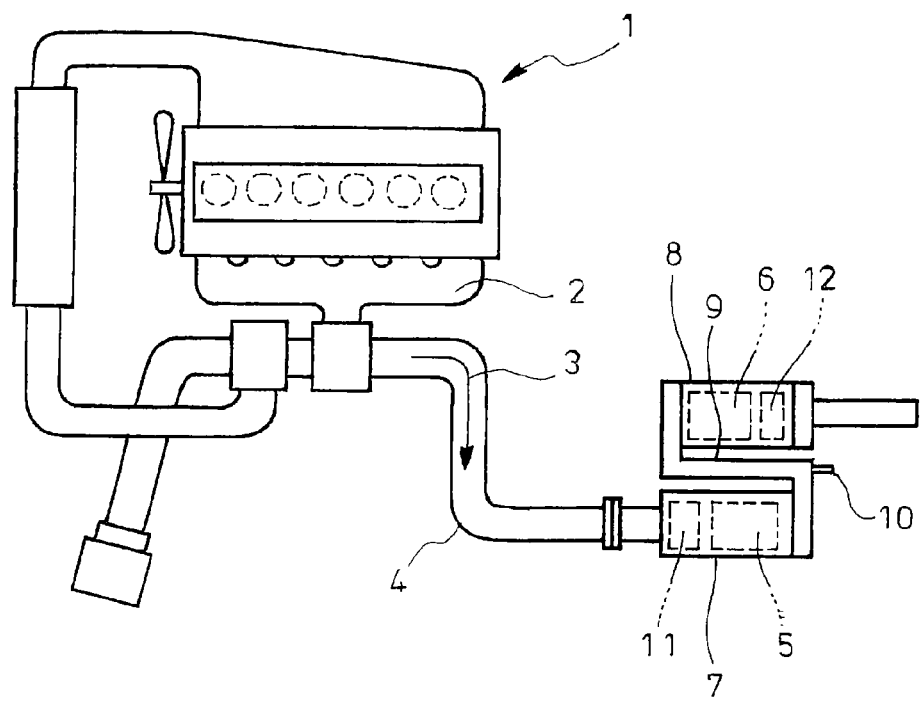
FIG. 1 is a schematic view showing a conventional device.
Figure 2:
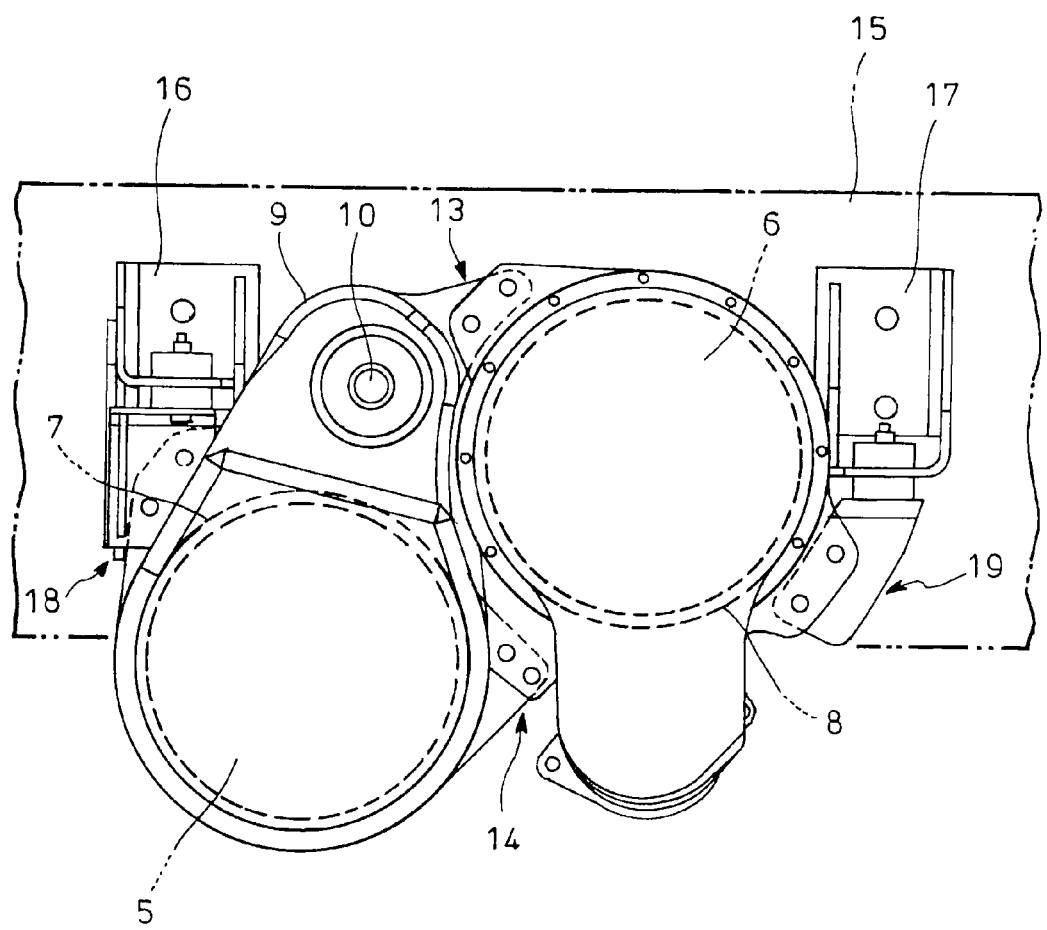
FIG. 2 is a front view of the exhaust emission control device shown in FIG. 1 looking axially of casings.

REFERENCE SIGNS LIST 3 exhaust gas
5 particulate filter
6 selective reduction catalyst
7 casing
8 casing
9 communication passage
10 urea water addition means
15 frame
20 separable portion
23 connection
24 connection
25 connection
26 connection

DESCRIPTION OF EMBODIMENT

An embodiment of the invention will be described in conjunction with the drawings.

Figure 3:
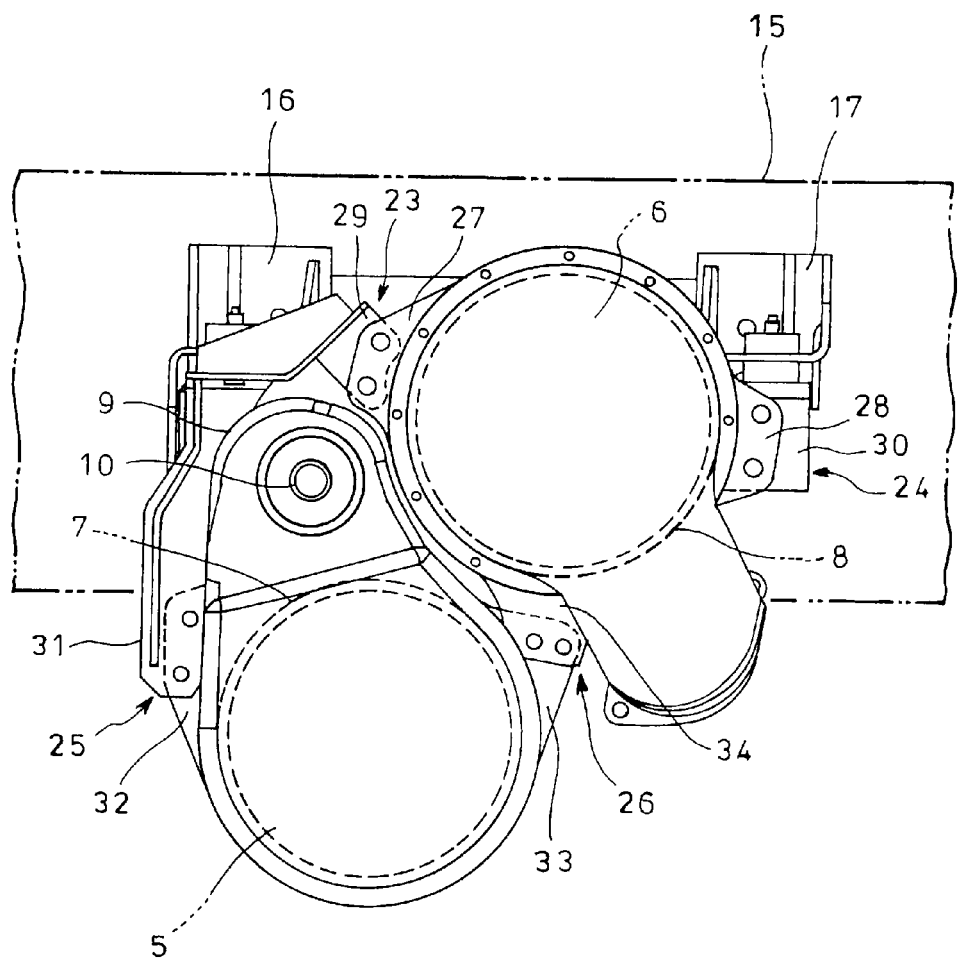
FIG. 3 is a front view showing an embodiment of the invention.
Figure 4:
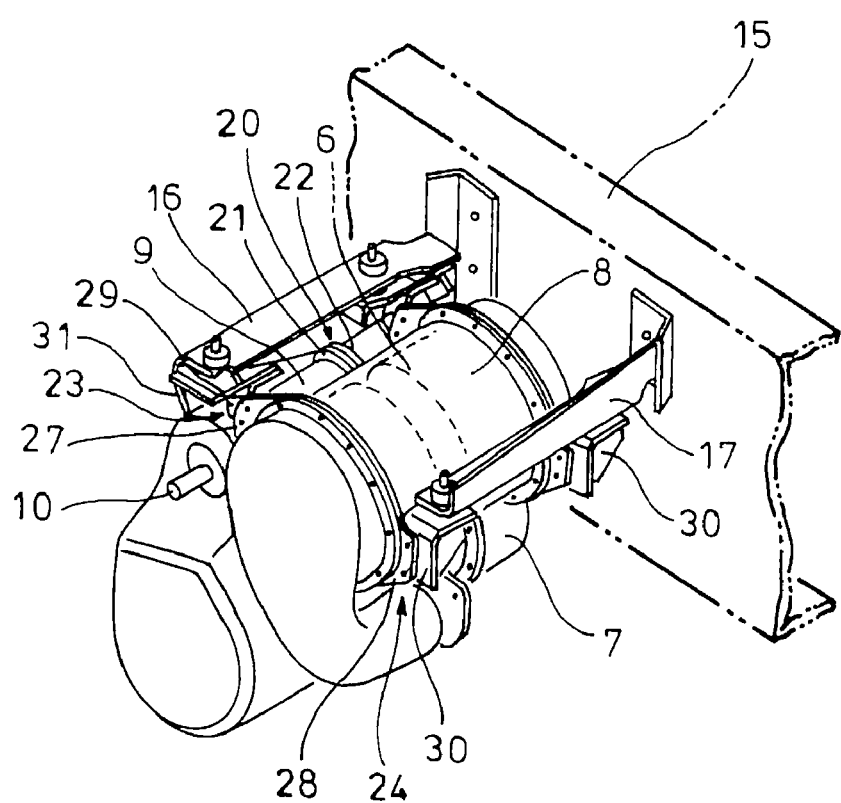
FIG. 4 is a perspective view showing the exhaust emission control device shown in FIG. 3 slantwise from above.
Figure 5:
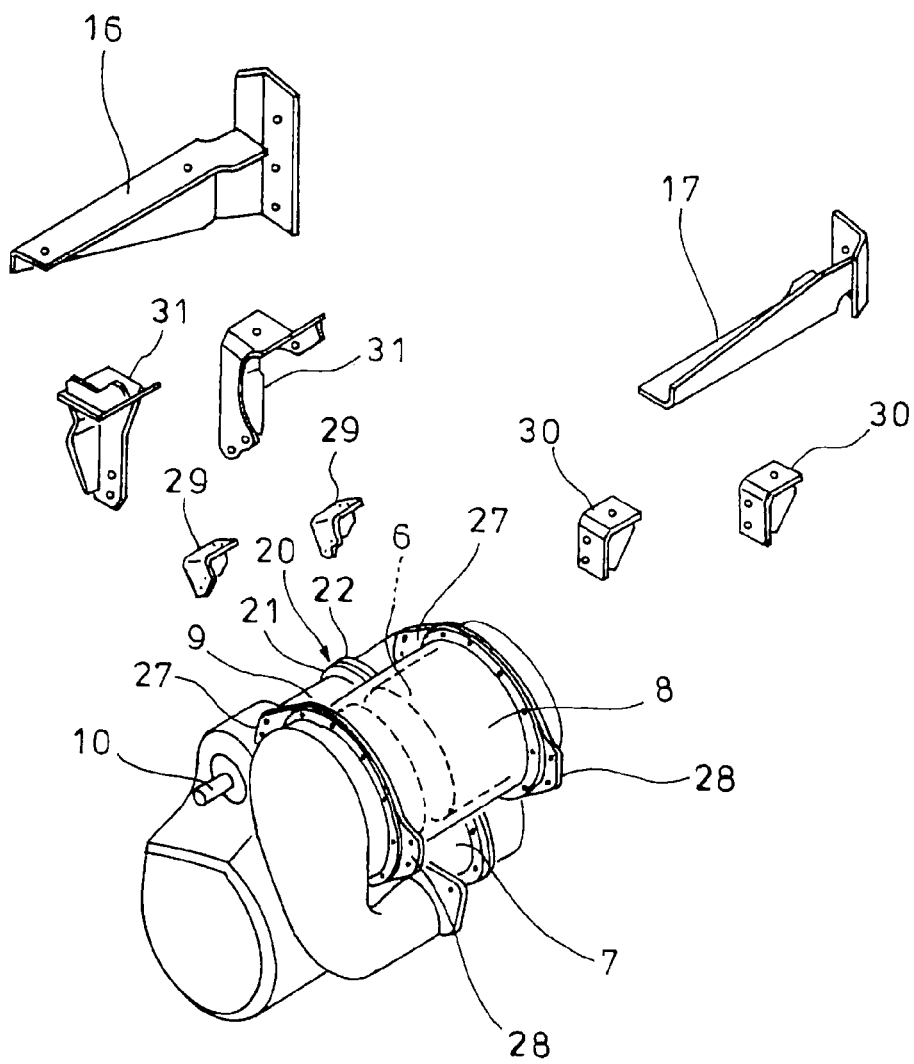
FIG. 5 is an exploded view showing particulars of a structure for supporting the exhaust emission control device shown in FIG. 4.

FIGS. 3-5 show the embodiment of the invention in which FIG. 3 is a front view of the exhaust emission control device according to the embodiment looking axially of casings 7 and 8; FIG. 4, a perspective view of the exhaust emission control device shown in FIG. 3 looking slantwise from above; and FIG. 5, an exploded view showing particulars of a structure supporting the exhaust emission control device shown in FIG. 4.

The embodiment illustrated is substantially similar to the above-mentioned structure shown in FIG. 1 in that an exhaust emission control device comprises a particulate filter 5 and a selective reduction catalyst 6 which are housed in casings 7 and 8, respectively, and are arranged side by side such that entry ends of the filter and the catalyst are directed in one and the same direction, and an S-shaped communication passage 9 which guides exhaust gas 3 discharged from a discharge end of the particulate filter 5 to an entry end of the adjacent selective reduction catalyst 6 through reversed turnabout, urea water being addible by urea water addition means 10 intermediately of the communication passage 9. The communication passage 9 has an intermediate separable portion 20 for suitable separate-off (see FIGS. 4 and 5). The casing 8 for the selective reduction catalyst 6 is supported on a vehicle body independently of the casing 7 for the particulate filter 5, and the casing 7 for the particulate filter 5 is detachably mounted and supported on the vehicle body and the casing 8 for the selective reduction catalyst 6.

Specifically, the communication passage 9 is intermediately divided and divided ends are provided with flanges 21 and 22, respectively, which in turn are detachably bolted together to thereby provide the separable portion 20. The casing 8 for the selective reduction catalyst 6 is arranged between a pair of brackets 16 and 17 fixed to a frame 15 on the vehicle body, and is attached at plural axial positions through connections 23 and 24 on lateral sides to both of the brackets 16 and 17, and the casing 7 for the particulate filter 5 is arranged downward of the casing 8 for the selective reduction catalyst 6 and is detachably mounted through connections 25 and 26 on the one 16 of the brackets and on the casing 8 for the selective reduction catalyst 6.

The connections 23 and 24 for attachment of the casing 8 for the selective reduction catalyst 6 to both of the respective brackets 16 and 17 comprise extensions 27 and 28 formed on parts of flanges at two separate axial positions on the casing 8, and bracket pieces 29 and 30 fixed to the respective brackets 16 and 17 for bolting in overlapped relationship with the extensions 27 and 28, respectively. The bracket pieces 29 are fixed to the one bracket 16 through intermediate brackets 31 which are referred to hereinafter, and the bracket pieces 30 are directly fixed to the other bracket 17.

Further, the connection 25 through which the casing 7 for the particulate filter 5 is mounted on the one bracket 16 comprises extensions 32 formed on parts of flanges at two separate axial positions on the casing 7 and the intermediate brackets 31 fixed to the one bracket 16 so as to be bolted together in overlapped relationship with the extensions 32.

The connection 26 through which the casing 7 for the particulate filter 5 is mounted on the casing 8 for the selective reduction catalyst 6 comprises extensions 33 formed on the flanges with the extensions 32 and at positions different from those for the extensions 32, and extensions 34 formed on the flanges with the extensions 27 and 28 and at positions different from those for the extensions so as to be bolted together in overlapped relationship with the extensions 33.

Thus, when the particulate filter 5 is to be taken out so as to be directly cleaned through, for example, air or water cleaning or so as to be replaced with a new particulate filter 5, the bolting of the flanges 21 and 22 at intermediately of the communication passage 9 is released to separate off the separable portion 20; and then, the bolting of the extensions 32 and the intermediate brackets 31 and the bolting of the extensions 33 and 34 are released to separate the casing 7 for the particulate filter 5 from the vehicle body and from the casing 8 for the selective reduction catalyst 6, so that the casing 7 for the particulate filter 5 can be taken out of position on the vehicle body with the casing 8 for the selective reduction catalyst 6 being left on the vehicle body in a reliably supported state, which is less troublesome than the conventional taking-out of the whole of the exhaust emission control device all at once, leading to lessening in workload.

Thus, according to the above embodiment, only the casing 7 for the particulate filter 5 can be easily taken out of position with the casing 8 for the selective reduction catalyst 6 being left on the vehicle body in a reliably supported state, so that labor required for maintenance of the particulate filter 5 can be substantially lessened in comparison with the conventional taking-out of the whole of the exhaust emission control device all at once.

Industrial Applicability

An exhaust emission control device of the invention is not limited to the above embodiment and that various changes and modifications may be made without departing from the scope of the invention. For example, the separable portion for the communication passage, the support of the casing for the selective reduction catalyst on the vehicle body and detachable mounting of the casing for the particulate filter on the vehicle body and on the casing for the selective reduction catalyst are not always restricted to those illustrated in the drawings.

The invention claimed is:

1. An exhaust emission control device comprising:
a particulate filter housed in a particulate filter casing;
a selective reduction catalyst housed in a selective reduction catalyst housing arranged downstream of said particulate filter and capable of selectively reacting $NO_x$ with ammonia even in the presence of oxygen, the casings arranged side by side such that entry ends of the particulate filter and the selective reduction catalyst are oriented to one and the same direction;
an S-shaped communication passage being provided for introduction of the exhaust gas discharged from a discharge end of the particulate filter to the entry end of the adjacent selective reduction catalyst through reversed turnabout, urea water being addible intermediately of said communication passage;
a separable portion arranged intermediately of the communication passage, the selective reduction catalyst casing being supported on a vehicle body independently of the particulate filter casing, the particulate filter casing being detachably mounted and supported on the vehicle body and on the selective reduction catalyst casing; and
a pair of brackets, fixed to a frame on the vehicle body, the selective reduction catalyst casing arranged between and attached to both of the pair of brackets, the particulate filter casing being arranged downward of the selective reduction catalyst casing and being detachably mounted on only one of the brackets and on the selective reduction catalyst casing.

2. The exhaust emission control device according to claim 1, wherein an upper portion of the selective reduction catalyst casing is attached to both of the pair of brackets and an upper portion of the particulate filter casing is detachably mounted on only one of the brackets.

* * * * *